United States Patent Office 3,116,124
Patented Dec. 31, 1963

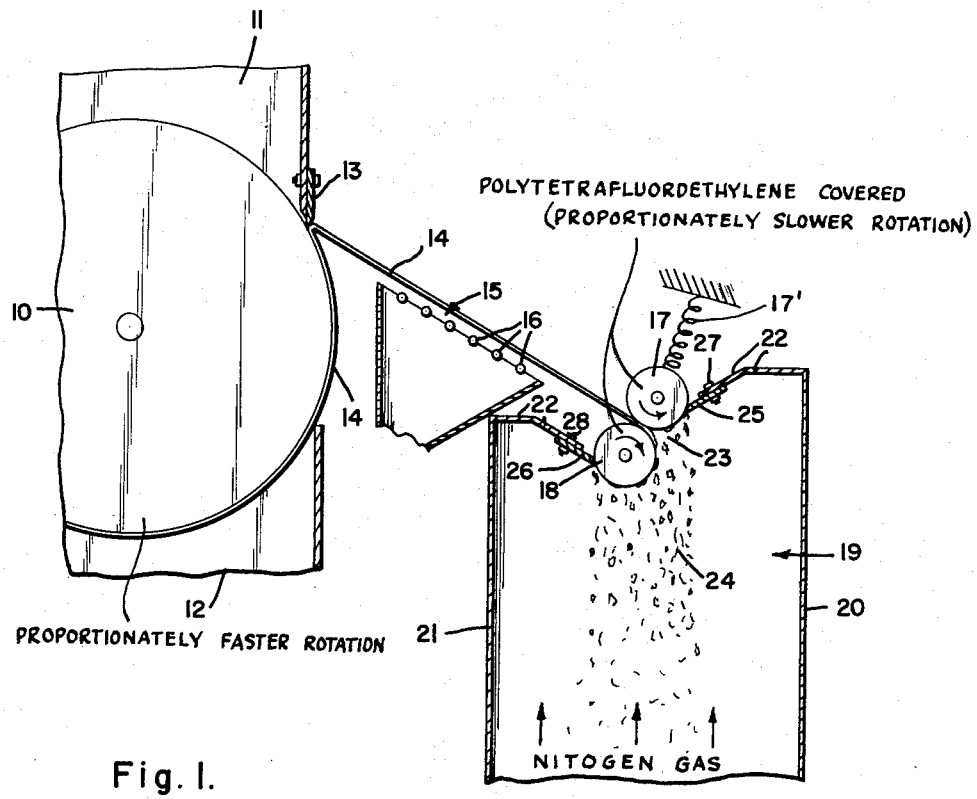
Fig. I.
INVENTOR.
Dave Eolkin

3,116,124
DRUM DRYING OF FOOD PRODUCTS
Dave Eolkin, San Lorenzo, Calif., assignor to Gerber Products Company, Fremont, Mich., a corporation of Michigan
Filed Mar. 10, 1961, Ser. No. 94,765
3 Claims. (Cl. 34—122)

This invention relates to drum drying apparatus and to a system incorporating the apparatus. More particularly, it relates to an improvement in that part of drum drying apparatus concerned with removal of the dried food sheet from the drum and its transportation to a point spaced from the drum drier for further processing. Further, the present invention relates to drum drying apparatus particularly adapted for drying high sugar content foods such as fruits as opposed to low sugar content foods such as cereals which do not give rise to the types of problems encountered when the high sugar content foods are dried.

Conventionally, high sugar content foods are dried on a drum drier whose surface is usually heated internally. The dried food sheet is removed from the surface of the drum as the drum is rotated by a doctor or knife blade which engages the surface of the drum and cuts or parts the food film from the drum surface. The food desirably comes away from the drum in a continuous sheet that is plastic in quality because of the high sugar content of the food.

It has been suggested to direct a stream of cooling air on the food sheet as it leaves the doctor blade. This improves the properties of the sheet and makes it more manageable.

The plastic sheet is drawn from the point of its removal by the doctor blade and is transported for further processing through the action of a drawing or tension roller that is spaced from the drum drier. After the sheet leaves the drawing roller, it is generally dried further and ground to a suitable particle size and then packaged.

Heretofore, considerable difficulty has been encountered at the tension roller stage or point in the apparatus. The plastic sheet is not completely dried by the drum drier for several reasons, most important being the susceptability of high sugar content food to scorching and flavor impairment by excessive heating. The remaining moisture imparts a tendency to the plastic sugar containing sheet to stick to the surfaces of the tension roller. This causes a gumming up of the tension roller surfaces and generally disrupts the smooth working of the apparatus. In an extreme case, it may even result in breakage of the plastic sheet resulting in a complete stoppage of the operation until remedied.

It is therefore a primary object of the present invention to eliminate sticking of the plastic sheet to the surfaces of the tension roller. A further object is to provide a device for use in combination with drum drying apparatus which will not only prevent the food sheet from adhering to and building up on the tension or drawing rollers, but will simultaneously prevent escape of a cooling gas which may be used to finally process and dry the plastic sheet. Still another object of the present invention is to provide a drum drying system for processing high sugar content food which will yield a final dried flaked product that is readily reconstitutable and not subject to the formation of food balls having dried centers when water is added for purposes of reconstitution.

Other objects, features, and advantages of the present invention will become apparent upon reading the following detailed specification and referring to the accompanying drawing.

In the accompanying drawing, FIG. 1 shows in side elevation a schematic layout of part of a drum drying apparatus and associated components including the device provided by the present invention for drying high sugar content food.

Generally, the present invention resides in providing scraper means cooperating with a take-off roller of the type referred to above. The scraper means removes particles of the drum dried food sheet from the surface of the roller and thereby eliminates a build up of material on the roller and possible disruption of the use of the apparatus.

While the rollers may be covered with any conventional type covering such as the various types of plastics or rubbers that are normally used, it has been found that if the rollers are covered with a polytetrafluoroethylene resin covering, the adherence of the food sheet to the roller will be minimized severely. Polytetrafluoroethylene resin is available commercially under the names Teflon, Fluon, or Fluoflex as well as others. If the tension rollers are covered with other types of material, generally an undesirable amount of the plastic sheet will stick to the surface.

In a preferred embodiment, the tension rollers are mounted on a chute or conduit having an entrance opening through which the roller drawn film may pass as it leaves the tension rollers. Upon entering the chute, the plastic film is contacted with a refrigerated or cooled gas to further dry the film and otherwise prepare it for final processing. Final processing may involve disintegration of the sheet, final moisture removal, and packaging. A typical sequence of steps involved in final processing is described in copending application Serial No. 35,011, filed June 9, 1960.

Preferably, the refrigerated atmosphere in the chute is nitrogen or another inert gas or combination thereof, to avoid undesirable oxidation or degradation of the food product. In any event, prevention of the scape of the cool atmosphere from the chute is obviously desirable for economy purposes as well as efficiency. In the preferred embodiment, the scraper blades are mounted in contact with the tension rollers by means which prevent the escape of the nitrogen gas through the entrance opening of the chute. Thus, the scraper blade simultaneously performs two important functions; that is, removal of film which sticks or adheres to the surface of the tension rollers and prevention of escape of the refrigerated gas used to further process the food.

Referring to the drawing, there will be seen a partial drum drier 10. Hood members 11 and 12 surround the drum 10. A doctor blade 13 is mounted on hood 11 adjacent to the surface of the drum 10 and removes food sheet 14 from the surface of drum 10 as it approaches and contacts blade 13.

The removed plastic sheet 14 passes over an air slide shown generally at 15 and is preliminarily cooled and otherwise made more manageable. Cool air is supplied in the direction of the arrow from a source not shown to air slide 15 and comes in contact with the sheet 14 by passing through apertures 16.

A pair of tension rollers 17 and 18 are disposed spaced apart from the drum 10 and the air slide 15. Rollers 17 and 18 draw sheet 14 therebetween. Tension roller 17 is an idler roller and roller 18 is powered by a motor (not shown). A spring (not shown) forces idler roller 17 against sheet 14 which is in turn urged against roller 18. A frictional force is thereby built up between rollers 17 and 18 and sheet 14. Power clockwise rotation of roller 18 thus draws sheet 14 away from doctor blade 13, and the movement of sheet 14 causes counter-clockwise rotation of roller 17.

The tension rollers 17 and 18 are disposed on a chute shown generally at 19. Chute 19 has sides 20 and 21 and top 22. Chute 19 has an entrance opening 23 defined in top 22 through which the roller drawn food sheet may enter the chute. A refrigerated gas, preferably nitrogen, is present interiorly of chute 19 and contacts the food sheet therein. Disintegration of the sheet 14 into particles or flakes 24 commences as the sheet falls through chute 19.

Scraper blades 25 and 26 are fixed to top 22 so that scraper 25 contacts the surface of tension roller 17 and scraper 26 contacts the surface of tension roller 18. Scrapers 25 and 26 are fixed to top 22 by means of bolts 27 and 28 respectively. The bolted junction between the scrapers 25 and 26 and top 22 is air-tight and prevents the escape of the refrigerated gas within chute 19. The contacts between scraper 25 and roller 17 and scraper 26 and roller 18 are also substantially gas-tight. Since the spring which urges roller 17 in frictional contact with sheet 14 and in turn urges sheet 14 in contact with roller 18 permits only the passage of sheet 14 between the rollers and leaves no substantial space, the roller, scraper, and chute construction is substantially gas-tight.

As roller 18 rotates in a clockwise direction, any particles of food sheet 14 that adhere to its surface are scraped clean by scraper 26 when reaching the point of contact with the scraper. Similarly, when roller 17 is turned in a counter-clockwise direction through the frictional contact with moving plastic sheet 14, adhering particles of food are scraped from its surface by scraper 25. Thus, the scrapers perform the dual function of removing adhering particles and preventing escape of refrigerated gas.

The food sheet particles 24 fall by force of gravity down chute 19 and are then available for further processing in any suitable manner known in the art. Thus, they may be carried away from the bottom of the chute by means of conveyors such as endless belt or screw type conveyors and contacted with low temperature air to complete the drying process. Since the chute entrance is gas-tight, the apparatus from that point on may be constructed as a sealed unit up to the point of discharge of the final product. Further disintegration of the particles may be desirable.

The product may then be hermetically or otherwise sealed in a package and made ready for distribution to the consumer.

Scrapers 25 and 26 are preferably made of a material which will not damage the covering of rollers 17 and 18. Suitable materials that may be used include metals, plastics, and rubber of a hardness that does not cut or damage the roller covering.

The packaged dehydrated food is normally obtained by the consumer who then reconstitutes it before eating. Thus, it is important that the product prepared by the apparatus of the present invention be readily reconstitutable to a foodstuff that approximates closely the original material before the dehydration process.

Heretofore, it has been thought that the thinner the plastic sheet taken from the drum drier for further processing, the better and more readily reconstitutable the final product would be. It was believed that by drawing out the sheet through rapidly turning tension rollers a thin sheet would be produced which, when flaked or disintegrated, would result in thin flakes or particles.

Careful analysis of the reconstituting properties of thin flakes have now established that in many cases the small particles, when contacted with water, form food balls having dry centers and do not result in a homogeneous reconstituted product. The present invention provides a system employing the foregoing described apparatus to overcome the problem evidenced by food balls having dry centers.

Broadly, the system achieves the desired result by drawing the food sheet away from its removal point on the drum drier at a slower rate than the rate of formation of the sheet on the drier. By removing the sheet at this slower rate, the thickness of the sheet is increased. Upon further drying and disintegration of the sheet, the flakes produced are of relatively large thickness as compared with prior techniques. These relatively thicker flakes are readily reconstitutable and do not exhibit the dry ball effect of the thin flakes mentioned above.

In the operation of the system of the present invention, the food is drum dried in conventional manner using apparatus such as illustrated in the accompanying drawing to form a plastic sheet and is removed from the drum surface with a suitable device such as a doctor blade 13. The removed sheet is drawn away from its removal point at a slower rate than its rate of formation on the drum drier whereby the thickness of the sheet is increased.

The desired thicker, plastic sheet is preferably formed by rotating the tension rollers 17, 18 at a proportionately slower angular velocity than the angular velocity of rotation of the drum drier 10. Of course, when the illustrated apparatus is employed in the system of the present invention, the adherence of the sheet to the tension rollers and escape of the cooling atmosphere are eliminated.

The term "proportionately slower angular velocity" is intended to refer to a rate of rotation of the tension rollers that is slower than normally required to just take up the amount of plastic film that is formed by the drum drier at the rate of its removal; i.e. slower than the equilibrium rate of rotation. Since the tension rollers usually have a smaller diameter than the drum drier, this equilibrium rate requires that the tension rollers rotate at a higher angular velocity than the drum drier. To be proportionately slower than the drum drier, the tension rollers would still rotate more revolutions per minute than the drum drier but the rate would be less than the equilibrium rate of rotation.

In addition to the drum drier and the tension rollers, any of the conventional apparatus for further drying, flaking, packaging, or otherwise processing the food may be used in the system of this invention.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An apparatus for the reduction of moisture in food containing a substantial amount of sugar comprising, in combination, a drum drier for drying said food in the form of a film, a doctor blade for removing the film from the drum drier, a pair of polytetrafluoroethylene resin covered tension rollers spaced from said drum drier for drawing the drum dried film and transporting it away from its removal point, an air slide disposed between said doctor blade and said tension rollers for directing a cooling stream of air on the removed food film, means for contacting the food film with a cool gas after said film is drawn by the tension rollers, and a scraper simultaneously cooperating with the tension rollers to remove sticking portions of the food film therefrom while simultaneously cooperating with said means for contacting the film with a cool gas to prevent the cool gas from mixing with the ambient atmosphere.

2. An apparatus in accordance with claim 1 where said tension rollers are mounted on a chute having an entrance opening through which the roller drawn film passes, means for supplying refrigerated nitrogen gas into said chute for contacting the roller drawn food film therein and thereby further cooling and drying the food to facilitate its disintegration, and wherein said scraper comprises a pair of blades respectively mounted in contact with the tension rollers by means preventing escape of nitrogen gas through the entrance opening in the chute.

3. An apparatus for the reduction of moisture in food containing a substantial amount of sugar comprising, in combination, a drum drier for drying said food in the form of a film, a doctor blade for removing the film from the drum drier, a pair of tension rollers spaced from said drum drier for drawing the drum dried film and transporting it away from its removal point, a receiving conduit containing cool gas associated with said rollers, said conduit having an entrance opening disposed to receive food film from said rollers, and scrapers mounted adjacent said entrance opening in contact with said rollers to remove sticking portions of food film therefrom, said scrapers being mounted with respect to said rollers and entrance opening so as to prevent the escape of cool gas from said conduit to the ambient atmosphere.

References Cited in the file of this patent

UNITED STATES PATENTS

| | | |
|---|---|---|
| 1,602,830 | MacPherran | Oct. 12, 1926 |
| 1,737,015 | Merrill | Nov. 26, 1929 |
| 2,140,788 | Cowgill | Dec. 20, 1938 |
| 2,259,606 | Beardslee | Oct. 21, 1941 |
| 2,435,842 | Northcutt | Feb. 10, 1948 |
| 2,556,954 | Zeigler | June 12, 1951 |
| 2,566,943 | King | Sept. 4, 1951 |
| 2,687,698 | Duffy | Aug. 31, 1954 |
| 2,707,923 | Hansen | May 10, 1955 |
| 2,830,911 | Fogelberg | Apr. 15, 1958 |
| 3,009,815 | Lorant | Nov. 21, 1961 |